(12) United States Patent
Shoda et al.

(10) Patent No.: US 6,509,111 B1
(45) Date of Patent: Jan. 21, 2003

(54) MAGNETIC RECORDING MEDIA AND MAGNETIC DISK APPARATUS

(75) Inventors: Mitsuhiro Shoda, Odawara (JP); Naoto Endo, Odawara (JP); Noriyoshi Goda, Odawara (JP); Yuzuru Hosoe, Hino (JP); Akira Kato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 153 days.

(21) Appl. No.: 09/609,327

(22) Filed: Jun. 30, 2000

(30) Foreign Application Priority Data

Sep. 24, 1999 (JP) ............................ 11-269867

(51) Int. Cl.[7] .............. G11B 5/66; G11B 5/70; G11B 23/00
(52) U.S. Cl. ............... 428/694 T; 428/694 TS; 428/697 TP; 428/694 TR; 428/900; 360/97.01; 360/131; 360/135
(58) Field of Search ............... 428/694 TS, 694 TP, 428/694 TR, 900, 65.4, 65.5, 65.7, 694 T; 360/97.01, 313, 131, 135

(56) References Cited

U.S. PATENT DOCUMENTS 6,197,367 B1 * 3/2001 Matsuda et al. ............ 427/127
6,383,404 B1 * 5/2002 Sakai et al. ................ 216/97

FOREIGN PATENT DOCUMENTS

| JP | 62-257618 | 11/1987 |
| JP | 63-187416 | 8/1988 |
| JP | 05-114127 | 5/1993 |
| JP | 07-095369 | 10/1995 |
| JP | 08-003893 | 1/1996 |
| JP | 08-297834 | 11/1996 |
| JP | 10-143865 | 5/1998 |
| JP | 11-110933 | 4/1999 |
| JP | 11-232638 | 8/1999 |

* cited by examiner

Primary Examiner—Holly Rickman
(74) Attorney, Agent, or Firm—Kenyon & Kenyon

(57) ABSTRACT

A magnetic recording media formed of magnetic alloy layer of Co as the main component on a substrate through an under-layer, a protective layer and a lubricant layer, stacked in this order, said under-layer comprises plural under-layers including a first under layer of a substantially amorphous and a second under layer of crystalline stacked in this order; and a $\Delta BH[0.01, 50]$ defined by $|BH[0.01\%]-BH[50\%]|$, as the difference between a height $BH[0.01\%]$ where a Bearing ratio is 0.01% and a height $BH[50\%]$ where a Bearing ratio is 50%, is not less than 3 nm and not more than 6 nm, where a Bearing Curve is given by a surface roughness curve of magnetic recording media.

5 Claims, 7 Drawing Sheets

MAGNETIC RECORDING MEDIA AND MAGNETIC DISK APPARATUS

BACKGROUND OF THE INVENTION

The present invention is related to a magnetic recording media which is possible to record large volume information and to a magnetic disk apparatus using this media, particularly suitable to a magnetic recording media and a magnetic disk apparatus for high density magnetic recording.

The requirement for larger capacity to a magnetic disk apparatus is increasing more and more. There are some countermeasures in order to increase the recording density such as (1) improvement of the sensitivity of a reproducing part of a magnetic head, (2) narrower distance between a head element and a recording surface of a magnetic recording media and (3) higher efficiency of a signal processing.

The adoption of a composite magnetic head, which is separated into a recording part and a reproducing part and uses a highly sensitive element utilizing magneto-resistive effect as the reproducing part, is rapidly increased in these years. Recently, a magnetic head utilizing the effect of large variation of magneto-resistance (i.e., giant magneto-resistive effect, or spin valve effect) of a stacked type magnetic layer, which is a stack of plural magnetic layers with non-magnetic layers intervened, is in practical use for the purpose of more improvement of the sensitivity of reproducing part of a head. This utilizes the variation effect of magneto-resistance cased by a relative change of magnetizing direction of plural magnetic layers with non-magnetic layers intervened, forced by a leakage magnetic field from the magnetic recording media.

On the other hand, as important factors to higher recording density of a magnetic recording media, such are listed up as (1) lower noise of a recording media matching to an improved sensitivity of the reproducing part of a magnetic head, (2) more flatness of the surface roughness of a media accompanied by narrower spacing between a head element and the recording film of a magnetic recording media and (3) thinner protective layer.

A longitudinal magnetic recording media using alloy with Co as a main component such as CoNiCr, CoCrTa, CoCrPt, or CoCrPtTa is widely used as a magnetic layer of magnetic recording media. A magnetic layer of Co-alloy containing Pt, particularly, exhibits high coercivity and increases output at high linear recording density region, so that it is suitable for high recording density. These Co-alloys conform to hexagonal closed packed construction with c axis as easy axis of magnetization, so it is preferred that c axis is directed longitudinally for the application of longitudinal magnetic recording media. Therefore, there is widely used procedure that the under layer of body centered cubic construction is formed first on a substrate, then Co-alloy magnetic layer is formed on it by epitaxial growth, thus c axis is directed longitudinally.

Conventionally, Cr has been used as under layer. But in case that large atoms as Pt, etc. are contained in the magnetic layer, a method of making c axis orient crystallographically parallel to the film surface is proposed (JP-A-NO.63-197018, JP-A-No.62-257618) by improving lattice matching between magnetic layer and under layer, using Cr-alloy whose lattice space is increased by adding Ti (JP-A-No.63-197018) or V (JP-A-NO.62-257618) to Cr. As for under layer materials other than these, it is disclosed by JP-A-No.63-187416 that a wide variety of materials including Mo, W, Hf, and so on are usable. And as disclosed by JP-B-No.10-143865, it is shown that media noise can be stably decreased by forming amorphous alloy layer containing Cr or Zr of highly oxidization tendency, in addition to Co as the main component, between Cr-alloy under layer as described above and a substrate, and by slightly oxidizing the surface by exposing the surface in oxygen atmosphere.

The following is proposed as a technology to improve reliability against contact of magnetic head and magnetic recording media. That is, preferable surface structure of magnetic recording media is proposed by JP-B-No.5-114127 and JP-B-No.8-297834 concerning wear reliability, which is suitable to preventing head crash and media damage mainly occurred by CSS (Contact Start Stop) at starting or stopping of an apparatus. And the media surface is proposed by JP-B-No.11-232638 to prevent contact of head and media. JP-B-No.7-95369 proposes a method applying projection on the media surface in order to improve wear reliability of a flexible disk using a contact type head.

In addition, a method to retract a magnetic head out of the media at stopping of the media rotation is disclosed by JP-B-No.11-110933 in order to reduce the media surface roughness accompanied by narrower flying height of the head and prevent adhesive problem of a magnetic head at stopping at the same time.

It became possible by the above prior art to prevent from adhesive problem of a head on the magnetic media and to decrease media noise caused by higher playback sensitivity of the magnetic head. However, the spacing is getting narrower rapidly in these days to achieve higher recording density, so that the head and media interface is becoming difficult to prevent a head from contact with the media even during recording or reproducing operation. Therefore, it is required for media surface to minimize the spacing loss and besides realize high wear reliability.

SUMMARY OF THE INVENTION

The first purpose of the present invention is to present a high wear reliable magnetic media with low friction even under such a condition of low glide height as described above in conjunction with low noise characteristics which is important to achieve high recording density. The second purpose is to present a highly reliable and large capacity magnetic storage apparatus.

In order to solve the problem described above, various kinds of magnetic recording media were prepared, which were formed of a magnetic alloy layer containing Co as the major component on an under layer on a substrate, a protective layer containing C as the major component and a lubricant layer stacked in the order, by changing the structure of the under layer and the surface shape of the media and their characteristics were evaluated. As the result it was found that a good result was obtained and the first purpose described above was achieved when the under layer was formed of plural under layers including first layer of substantial amorphous and second layer of crystalloid laid in that order, and $\Delta BH[0.01, 50]$ defined by $|BH[0.01\%]-BH[50\%]|$, which is the difference of the height of $BH[0.01\%]$ (i.e., Bearing ratio is 0.01%) and the height of $BH[50\%]$ (i.e., Bearing ratio is 50%), was not smaller than 3 nm and not larger than 6 nm in the Bearing Curve given by a surface roughness curve of the magnetic recording media.

By forming substantial amorphous layer as the first under layer, the second under layer of crystalloid formed on the first layer can be of fine crystalloid, and the crystalloid of the magnetic layer formed on it becomes also fine, so that the media noise is decreased. In addition, the growth of abnormally large particles of crystalloid, which are observed during the crystal growth in case of crystalline film, is suppressed by making the first layer be substantial amorphous. Thus, the probability of contact of the slider and the media is decreased when the glide height of a magnetic head slider is reduced, so that both of less media noise and higher reliability are achieved at the same time. The wording of 'substantial amorphous' herein defines the structure which diffraction pattern is observed as halo by a photograph of selected area electron diffraction image by a transmission electron microscope. The microscopic structure of layers constructing this kind of magnetic recording media can be evaluated by observing with a transmission electron microscope with high magnifying power, or by observing the diffraction ring pattern of selected area electron diffraction image, a sample piece thinly sliced in perpendicular direction to the surface of the substrate or a sample piece of the substrate thinned by machine grinding first and then thinned again on the both sides of top and bottom by ion-thinning-method.

CoCrZr, NiCrZr, CoP, NiP and so on can be used as a material composing the first under layer. By using Co or Ni as a main component of the first under layer, high bond strength to the substrate can be obtained. If Cr or P is added as an additional element, the ferromagnetic factor of Co or Ni contained in the first under layer is effectively decreased so that the magnetization of the first under layer can be negligible small to a reproducing head. An alloy containing Ni or Co as a major component, which contains Cr and Zr at the same time, is preferable since it gains particularly high corrosion resistant characteristics by adding Cr, and is very preferable to add furthermore Zr to it since it can make the first under layer be amorphous without degrading corrosion resistance. When P is added, it realizes both of the effective reduction of ferromagnetic factor of Co or Ni and the change to amorphous at the same time. By exposing slightly the surface of CoCrZr, NiCrZr or NiP to oxide atmosphere, the crystalline particles of Cr alloy under layer formed on it can be minute, and the crystallographic orientation can be coincided to (100) orientation which can make c axis of Co alloy be parallel to the film plane. As the result the media noise is reduced stably. Instead of Cr added to the first under layer, adding Ti, V, Mo or Nb also gives equivalent effect to the case of Cr. Moreover, instead of Zr added to the first under layer, adding Ta, Hf, Y or W also gives equivalent effect to the case of Zr. The thickness of the first under layer is preferred to be not smaller than 20 nm and not larger than 80 nm. It becomes easier for a media damage caused by contact with a head to be happened if the thickness of the first layer is less than 30 nm. On the other hand, the thickness larger than 80 nm is not preferable since the efficiency of mass production becomes lower. It is specially preferred that the thickness of the first under layer is not less than 30 nm and not more than 65 nm since it realizes particularly high reliability and high mass production efficiency.

The crystalline structure of the second under layer is preferred to be an nonmagnetic metal of body centered cubic structure. As an example, a thin film of nonmagnetic Cr-base alloy in forms of solid solution of (100) orientation is used, which is expected to be good crystalline matching orientation to a magnetic layer. The (100) orientation herein means crystallographic orientation of (100) plane of crystalloid to be parallel to the substrate plane. As the material of the second under layer, alloy of CrTi, CrTiMo, CrMo or so on can be used. The thickness of the second under layer is preferred to be not less than 3 nm and not larger than 60 nm. It becomes difficult to control crystalline structure and crystallographic orientation of the magnetic layer formed on it if the thickness is less than 3 nm. The thickness is not preferred more than 60 nm since it tends to make abnormal growth of crystalline particles unexpectedly which is an obstructive factor for gliding of a head and degrades mass production efficiency. It is particularly preferred for the thickness of the second under layer to be not less than 15 nm and not larger than 35 nm since low noise and high reliable media against low glide height can be produced efficiently. It is preferred for the density of additive Ti of the second under layer to be not less than 18 at. % and not more than 23 at. % in case of CrTi alloy as second under layer. If the density of Ti as an additive within said second under layer of CrTi alloy is less than 18 at. %, the crystalline matching to the magnetic layer is decreased. It is not preferred that the density of Ti as an additive is greater than 23 at. %, on the other hand, since the size of crystalline particles of the under lager and that of the magnetic layer, continuously formed on the under layer, becomes large so that media noise increases.

When $\Delta BH[0.01, 50]$ defined by $|BH[0.01\%]-BH[50\%]|$, which is the difference of the height of $BH[0.01\%]$ (i.e., Bearing ratio is 0.01%) and the height of $BH[50\%]$ (i.e., Bearing ratio is 50%), is not smaller than 3 nm and not larger than 6 nm in the Bearing Curve given by a curve of the surface roughness of the magnetic media, the friction at contact of head slider and media is suppressed in low so that higher wear reliability is achieved. It is particularly preferred that the surface structure of the media forming substantial amorphous layer as the first under layer meets the condition as described above since all the characteristics of low noise, low glide height and high reliability are achieved simultaneously. $\Delta BH[0.01, 50]$ less than 3 nm increases the friction at contact of head and media and shortens the life under the continuous sliding wear test. In addition, the head vibrates in pitching axis causing unstable recording and reproducing, therefore it is not preferable. It is not preferred that $\Delta BH[0.01, 50]$ exceeds 6 nm, on the contrary, since the spacing between head slider and media can not be reduced enough to achieve high recording density beyond 10 gigabits per square inch. It is preferable figure to achieve high wear reliability that $\Delta BH[0.01, 50]$ is not less than 3 nm and not more than 6 nm, and $\Delta BH[0.0 1, 0.8]$ defined by $|BH[0.01\%]-BH[0.8\%]|$, which is the difference of the height $BH[0.01\%]$ (i.e., Bearing ratio is 0.01%) and the height $BH[0.8\%]$ (i.e., Bearing ratio is 0.8%), is not more than 3 nm. It is not preferable that $\Delta BH[0.01, 0.8]$ exceeds 3 nm since the life under continuous sliding wear test is shortened. In order to improve higher reliability against continuous contact of head slider and media, the following condition is preferred. That is:

where the difference between the height $BH[1\%]$ (i.e., Bearing ratio is 1%) and the height $BH[50\%]$ (i.e., Bearing ratio is 50%), in Bearing Curve given by the surface roughness curve of media, is defined as y ($=|BH[1\%]=BH[50\%]|$), and the difference between the height $BH[15\%]$ (i.e., Bearing ratio is 15%) and the height $BH[50\%]$ (i.e., Bearing ratio is 50%) is defined as x ($=|BH[15\%] BH[50\%]-BH[50\%]|$); then, the point expressed as coordinates (x, y) is within the area surrounded by a segment between point (0.1, 1.6) and point (1, 3), a segment between point (1, 3) and point (1, 4), a segment between point (1, 4) and point (0.1, 4) and a segment between point (0.1, 4) and point (0.1, 1.6) on xy coordinate plane, and mathematical average of the roughness (Ra) is not more than 0.7 nm.

The life under continuous sliding wear test becomes shorter by one order or worse under the condition out of the area described above.

In order to achieve higher recording density than 20 gigabits per square inch, $\Delta BH[0.01, 50]$ is preferred to be not less than 3 nm and not more than 4 nm for reducing the glide height.

Bearing Curve herein means the Bearing Curve advocated by Abbot, and Bearing ratio means a ratio of the length of the Bearing shown by Japanese Industrial Standard (JIS B 0601) (Reference document: page 23 of 'Tribology' by co-writer of Yamamoto and Kaneda, published by Rikougakusha). Mathematical average of roughness is in accordance with the expression written in Japanese Industrial Standard (JIS B 0601).

As a forming method of the surface of magnetic recording media described above, it is preferred to form the surface shape so as $\Delta BH[0.01, 50]$ is not less than 3 nm and not more than 6 nm by machining or by chemical surface processing on the surface of a substrate. As for other forming methods of the surface, there is a method which makes low melting point metal like Al grow in island-shaped by sputtering method or a method which makes the protective layer uneven by etching the protective layer by Ar with masking by micro particles sprayed over the surface of it. However, these two methods have demerit as follows. That is, the method, which makes low melting point metal like Al grow in island-shaped by sputtering method, lacks reliability from wear resistant point of view since the low melting point material to form unevenness on the protective layer is low in hardness and Young's modulus and is easily deformed in general. And the method requires the best suited under layer in order to make low melting point material grow in island-shaped with the most suitable height and density so that it is required to add two spattering processes, then it becomes difficult to keep film-forming process stable and to control it. The method which makes the protective layer uneven by etching the protective layer by Ar, etc. can not avoid cohesion of micro particles used as a mask, so that such cohesion makes large area of projection. The frictional sliding distance becomes long which causes high frictional heat when a head runs through such the large size of projection, therefore it is not preferable because of large playback noise caused. On the other hand, the method to form shape is possible to use wet process in basic to form desired shape of the surface of substrate, which reduces the cost comparing to dry process mentioned above. It is also possible to overcome such two drawbacks as described above and to achieve stable mass production of magnetic recording media. Substrate of tempered glass like Aluminosilicate, Soda-lime, etc. is suitable to the substrate to form mentioned surface shape, however, it is not limited as far as forming such shape as described above is possible.

As the magnetic layer, it is preferred to use a magnetic film which density of cobalt and gold is not more than 80% within composing elements and which coercive force is not less than 240 kA/m when it is measured by a vibrating sample magnetometer applying 800 kA/m of magnetic field to the film plane at room temperature. This is because it has good electromagnetic characteristics in high recording density area. However, the overwrite characteristics is degraded when the coercivity exceeds 400 kA/m, so that the coercivity of media is preferred to be within the value which is controllable keeping overwrite capability. It may also apply an under layer of Cr—Mo etc. between said second under layer and the magnetic layer.

For improving wear reliability, it is preferred to apply 3 nm to 12 nm thick protective layer of carbon as a main component on the magnetic layer, and to apply a lubricant layer of 0.5 nm to 3 nm thickness of adsorptive material like perfluoro polyether, etc. on the surface again.

The second purpose of the present invention is achieved by the following manner. As to a magnetic recording apparatus, comprising magnetic recording media, a drive part driving said magnetic recording media, magnetic heads comprising recording part and reproducing part, means to move said magnetic heads relatively against the magnetic recording media mentioned above, mechanical part to make the heads ramp, input means of signal to said magnetic heads, and recording and reproducing signal processing means to reproduce the output signal from said magnetic heads, the reproducing part of the magnetic heads comprises plural electro-conductive magnetic layers which make big resistance change due to relative change of magnetizing direction of external magnetic field and a magneto-resistive sensor containing an electro-conductive nonmagnetic layer placed between said electro-conductive magnetic layers, and the above magnetic recording media in accordance with the present invention is used as the magnetic recording media.

As said magneto-resistive effect head, it is preferred to form the magneto-resistive sensor between two shield layers of soft magnetic material displaced to each other layer by from not less than 0.06 micron to not more than 0.18 micron. The output cannot be obtained enough in the high recording density area beyond 500 kFCI if the distance of the shield layers is greater than 0.18 micron. And it becomes not easy to keep enough insulation between the shield layer and the magneto-resistive sensor if the distance of the shield layers is less than 0.06 micron. It is preferred that the product (Br×t), where t is the thickness of said magnetic recording media, and remanent magnetization flux density Br, where Br is measured applying magnetic field along to the relative moving direction of the magnetic head against the magnetic recording media, is not less than 3.2 mA (40 Gauss-micron) and not more than 6.4 mA (80 Gauss-micron). It increases the danger to reproduce wrong information by degradation of reproducing output being left long time after being recorded if Br×t is less than 3.2 mA (40 Gauss-micron). It becomes difficult to overwrite at recording if Br×t exceeds 6.4 mA (80 Gauss-micron).

As for the magnetic recording apparatus described, the reproducing part of the magnetic head is preferred to use plural electro-conductive magnetic layers, which make big resistance change due to relative change of magnetizing direction by external magnetic field, and a magneto-resistive sensor containing an electro-conductive nonmagnetic layer, placed between said electro-conductive magnetic layers, in order to get stable read-back signal recorded at maximum linear recording density over 400 kFCI. In addition, the structure of the magnetic head is preferred so as that the glide height is not more than 13 nm, the area of the surfaces of glide rails is not larger than 1.4 square millimeter, and that the mass of the slider is not more than 2 mg. According to this, it is achieved that the possibility of a crash of the magnetic head to said projection is reduced and, at the same time, the energy at a crash can be small, so that both of high recording density more than 11 gigabits per square inch and high reliability against a crash are achieved.

DETAILED DESCRIPTION

The following is to explain the preferred embodiments of the present invention in detail by referring related figures.

EMBODIMENT 1

Figure 1:
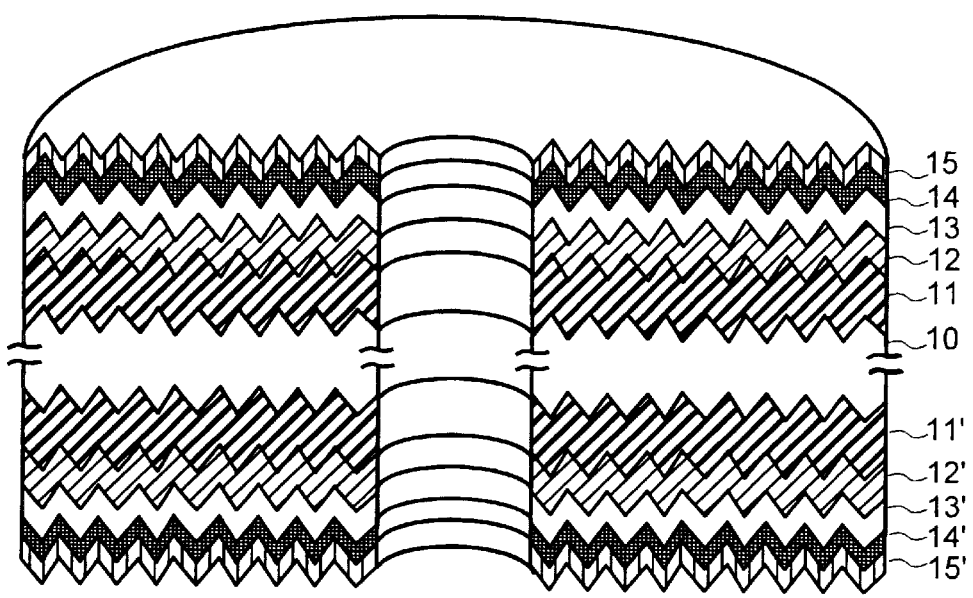
FIG. 1 is a drawing to illustrate a cross section of an embodiment of magnetic recording media of the present invention.

FIG. 1 is a drawing to illustrate a cross section of an embodiment of magnetic recording media of the present invention. A disk substrate of 0.635 thick and 2.5 inches type of Almino-silicate glass with the surface chemically tempered was used as a substrate 10. It was formed with multi-layer films, as follows, on the surface by using a static magnetron sputtering system (MDP250B) made by Intevac after cleaned up. First, the first under layers 11 and 11' of 40 nm thickness composed of alloy with 65 at. % of Ni, 20 at. % of Cr and 15at. % of Zr were formed on both sides of the surface of a substrate 10. Thereafter, it was heated up to about 230 deg. C on the substrate using a lamp heater, and exposed in an environment of mixed gas of 5 mTorr pressure with 99% of Ar and 1% of $O_2$ during 3.5 seconds. Then the second layers 12 and 12' of 30 nm thickness composed of alloy with 80 at. % of Cr and 20 at. % of Ti were formed, magnetic layers 13 and 13' of 20 nm thickness composed of alloy with 66 at. % of Co, 22 at. % of Cr and 12 at. % of Pt were formed, and protected layers 14 and 14' of 8 nm thickness were formed on them, in this sequence. Then it was taken out of the sputtering system, and lubricant of perfluoro polyether as the main component is coated on the protective layers to form lubricant layers 15 and 15' of 2 nm thickness each.

In the above process of forming first under layer 11 and 11', second under layer 12 and 12', and magnetic layer 13 and 13', Ar gas was used for discharging gas, the pressure of which was 7 mTorr (0.933 Pa). In the process of forming protective lager of carbon 14 and 14', Ar gas including nitrogen gas was used for discharging gas, the pressure of which was 10 mTorr (1.33 Pa).

As an evaluation purpose of the finished platter, the magnetic recording media produced by the above process was cut to a piece, the stacked layer films portion was thinned by ion-thinning method on both sides in the perpendicular axis of the films like conical shape, and then the micro-structure of the first under layer was observed by a transmission electron microscope with 200 kV acceleration voltage. As the result, there was no crystalline particle greater than 5 nm in diameter found. And also, halo was observed by taking a photo of selected area electron diffraction image, by which it was confirmed the first layer to be substantial amorphous.

Figure 2:
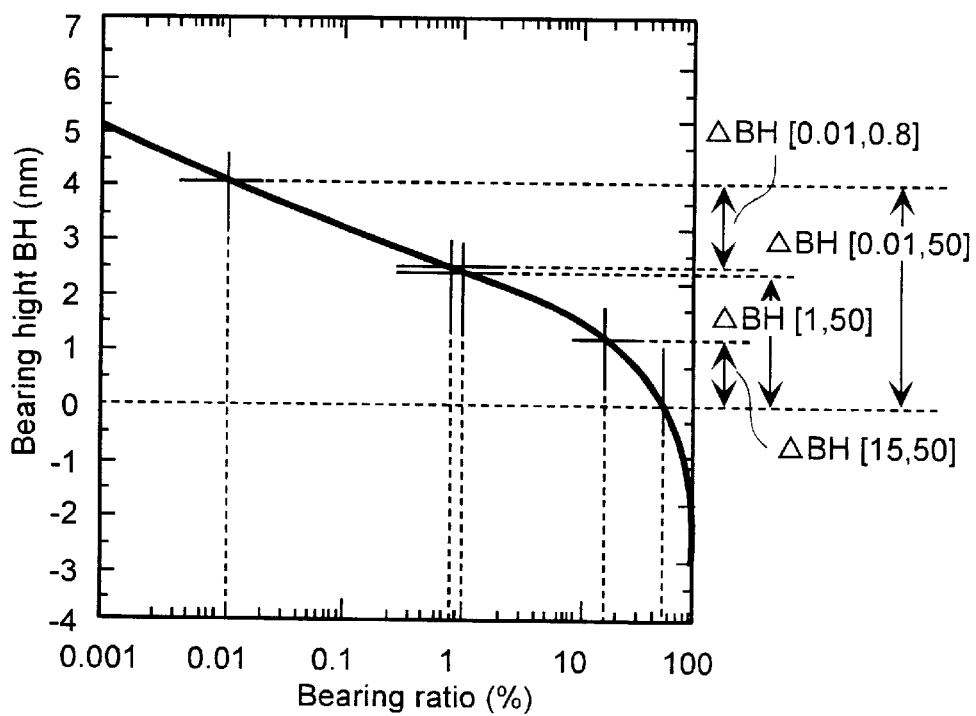
FIG. 2 is an example of Bearing Curve of magnetic recording media.

FIG. 2 shows Bearing Curve given by a curve of surface roughness, which vertical axis is the height (i.e., Bearing height BH) based on BH[50%] which makes Bearing ratio be 50%, and the horizontal axis shows Bearing ratio in logarithmic function. Here, $\Delta$BH[0.01, 50]=|BH[0.01%]−BH[50%]| is defined by the difference between the Bearing height BH[0.01%] where the Bearing ratio is 0.01% and Bearing height BH[50%] where the Bearing ration is 50%.

As the result of measurement on 8 points as total within the area from 14 mm to 31 mm in radius of the both surfaces of the substrate used by the present embodiment, $\Delta$BH[0.01, 50] at each measuring points was between 4.10 nm and 5.05 nm, which average was 4.59 nm. On the other hand, as the result of the measurement on 8 points as total within the area from 14 mm to 31 mm in radius of the both surfaces of the above media after forming lubricant layer on the platter, $\Delta$BH[0.01, 50] at each points was between 3.92 nm and 4.96 nm, which average was 4.53 nm. As shown here, the difference of $\Delta$BH[0.01, 50] between the surface of the substrate and the surface of the magnetic recording media is as small as less than 2%, which means that the surface shape of a media is almost decided by the shape of the substrate. In the present embodiment, the media which $\Delta$BH[0.01, 50] of media surface was from 3 nm to 6 nm were made by changing the surface shape of the substrate.

The surface shape above was measured by a scanning probe microscope (SPM) Nanoscope III made by Digital Instruments. The measurement area was 10 $\mu$m×10 $\mu$m, number of scanning lines was 256, and scanning speed was 1 line/sec. The surface roughness curve was measured by tapping mode using a cantilever with a scanning probe of non-dope-silicon as narrow as 20 nm or less in radius of curvature. The tapping mode herein means a scanning method by lightly and intermittently swinging on the surface with a cantilever which is vibrated in around resonant frequency (approximately from 50 k to 500 kHz) by Piezo vibrator. The absolute value of the height was calibrated by VLSI pattern (Model Number: STS2-180, Serial Number: 3091-01-105) made by VLSI Standard. The resolution of height was measured at 0.02 nm. The data measured was processed by filtering process Flatten (order=2) before calculating for Bearing Curve.

Figure 3:
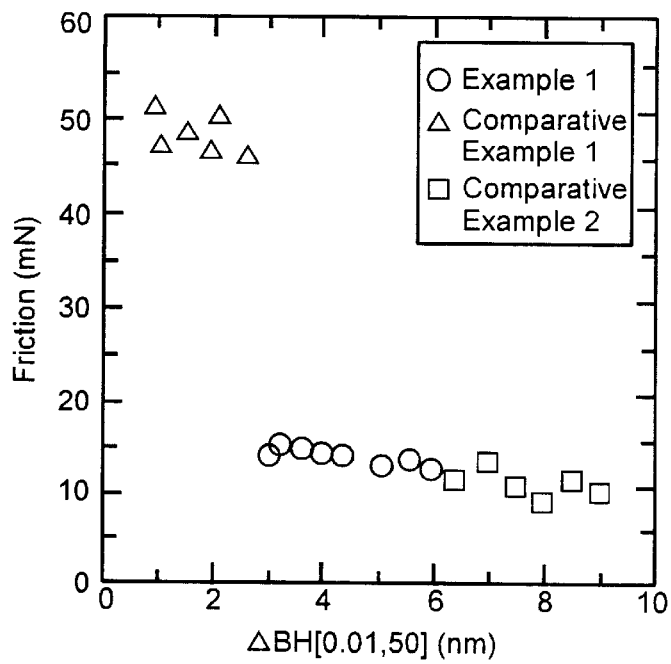
FIG. 3 is a figure to show the relation between friction force and surface shape.

The relation between friction force, when a head and the media surface of the present embodiment touched together at the setting value of 4 nm as glide height, and $\Delta$BH[0.01, 50] is shown in FIG. 3. The friction force was measured by detecting the distorted value of a parallel spring, on which the head was attached by using a strain gauge sensor. In order to get absolute value of friction force, the relation between the output of a strain gauge distorted by given weight and the amount of weight was obtained by using a weight. The radius of the measuring point was 22 mm from a center, and the skewed angle was set at 0 deg. The head used was a pico sized negative pressure type of slider (1.2 mm length×1 mm width). In general, friction force correlates with life of continuous sliding wear test, and there is the tendency that the greater friction, the shorter life. And recording/reproducing becomes impossible when friction force exceeds 25 mN since a slider does not slide stably on the media surface and vibrates in pitching axis. The friction force of the magnetic recording media made for the present embodiment was from 12 mN to 15 mN so that it was in the range of no problem in terms of wear reliability and recording/reproducing characteristics.

Figure 4:
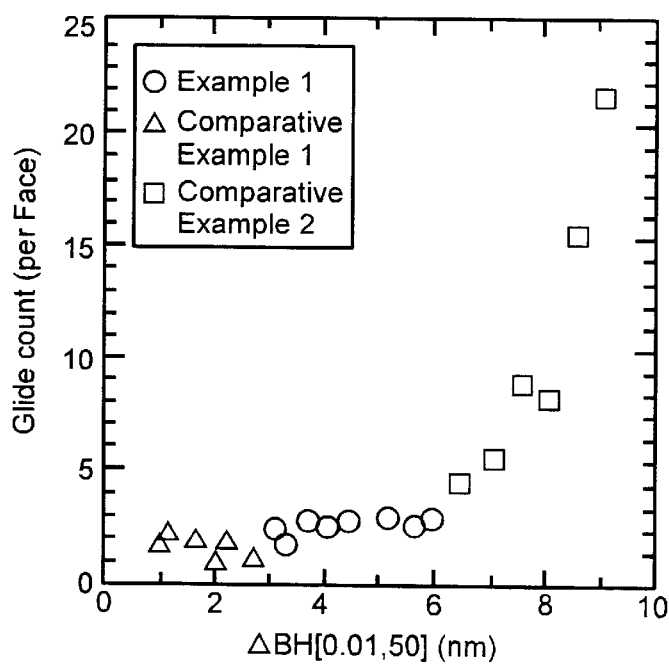
FIG. 4 is a figure to show the relation between glide count and surface shape.

The relation between glide count at 7 nm in head glide height and $\Delta BH[0.01, 50]$ is shown in FIG. 4. The glide height herein means number of projections with which a head contacts within the area from 14 mm to 31 mm in radius on a single surface of a disk media. A slider with Piezo element mounted on a suspension of 49 mN in weight was used as the head. It is a range suitable to mass production where glide count is not more than 5. The magnetic recording media of the present embodiment was within this range so that recording density as high as equal to or more than 11 gigabits per square inch was achieved.

As the basic, the present invention uses a floating type head using mainly the effect of air film. In such a system, it is important to control the shape of media surface beyond a center line (the height where so-called Bearing ratio is 50%) of the surface roughness of media, which causes particularly large interference with head, in order to get high reliability. And as a result after evaluating wear reliability of media with various surface shapes, it was found to be necessary to control the shape of surface until Bearing ratio became around 0.01% in case of a hard disk apparatus where the media rotated at not less than 400 rpm and possibly media surface contacted with the head at the relative speed exceeding 10 m/sec. Concretely, high reliability is obtained by controlling the shape of media surface so as to make $\Delta BH[0.01, 50]$ as a guideline be between 3 nm and 6 nm, where $\Delta BH[0.01, 50]$ means a difference of the height where Bearing ratio is 0.01% and the height where Bearing ratio is 50%. (Br×t) as the product of the thickness t of magnetic layer of the media made for the present embodiment and remanent magnetization flux density Br, which was measured applying magnetic field along to the relative moving direction of a magnetic head against the magnetic recording media, was 4.8 mA (60 gauss-micron), and the coercivity was 260 kA/m. When the ratio SLF/Nd, where SLF was an amplitude (0-p value) of isolated read-back output and Nd was integrated media noise in case of recording a signal in 400 kFCI recording density, was evaluated using this media, the result was so high as 28.3 dB. The head used here comprised a reproducing element of spin valve type with the shield gap length Gs of 0.18 micron, as shown by the embodiment 7, and a inductive recording element with the gap length of 0.25 micron, and the glide height was 15 nm.

COMPARING EXAMPLE 1

In this comparing example 1, the magnetic recording media was made under the same condition as the embodiment 1 described above except that $\Delta BH[0.01, 50]$ of media surface was from 1 nm to 2.6 nm.

The relation between the friction force and $\Delta BH[0.01, 50]$ of the media of present comparing example is plotted in FIG. 3. The friction force of the media in the present comparing example is from 46 mN to 52 mN, while the friction force was from 12 mN to 15 mN in case of the media in the embodiment 1. This means not only degradation of reliability but also impossibility of stable recording/reproducing. Therefore, it is difficult to achieve so high recording density as 11 gigabits per square inch or more in case of the present comparing example.

COMPARING EXAMPLE 1

In this comparing example 2, the magnetic recording media was made under the same condition as the embodiment 1 described above except that $\Delta BH[0.01, 50]$ of media surface was from 6.3 nm to 9.1 nm.

As shown in FIG. 3, the friction force in comparing example 2 is from 8 mN to 13 mN, which is equivalent to the embodiment 1 or less. Therefore, there is little problem happened of wear reliability and stable recording/reproducing characteristics. However, as shown by FIG. 4, glide count is increased rapidly in accordance with $\Delta BH[0.01, 50]$ being larger. This means that the possibility of head crash is high and there is problem of wear reliability. Therefore, it is difficult to achieve so high recording density as 11 gigabits per square inch or more in case of the present comparing example.

EMBODIMENT 2

As the embodiment 2, the magnetic recording media was made under the same condition as the embodiment 1 described above except that $\Delta BH[0.01, 0.8]$ of media surface was from 0.22 nm to 3.84 nm. $\Delta BH[0.01, 0.8]$ herein means, as shown in FIG. 2, a difference between Bearing height BH[0.01%] where Bearing ratio is 0.01% and Bearing height BH[0.08%] where Bearing ratio is 0.08% (=|BH[0.01%]–BH[0.08%]|). As the result of the measurement of $\Delta BH[0.01, 50]$ of the media of embodiment 2 was within the range from 4.42 nm to 5.38 nm.

Figure 5:
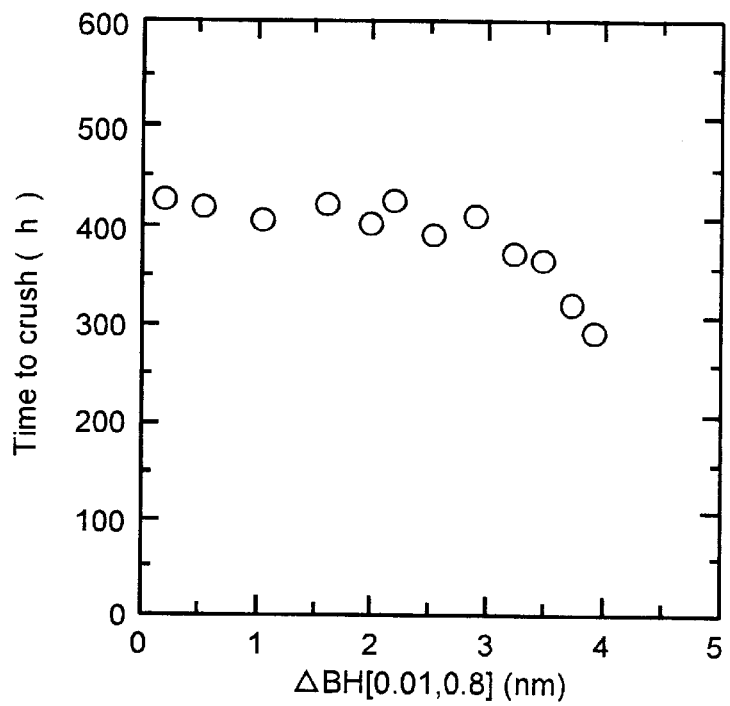
FIG. 5 is a figure to show the relation between the time until a crash occurred under frictional sliding wear test and surface shape.

FIG. 5 shows the relation between the time until a head crash occurred, while a head with the setting of 4 nm glide height was continuously contacting with media, and $\Delta BH[0.01, 0.8]$. It shows that the time until head crash occurred becomes shorter in accordance with $\Delta BH[0.01, 0.8]$ being larger where $\Delta BH[0.01, 0.8]$ exceeds 3 nm. The fact that $\Delta BH[0.01, 0.8]$ is large means that the tolerance of the height at peaks of the surface roughness is large, so it is considered that plastic deformation starts from the higher portion within the tolerance and the media is worn out. As for the high recording density as 11 gigabits per square inch or more which the present invention intends to achieve, the thickness of protective layer on the magnetic layer is so thin as not more than 8 nm, so that it is not possible to get enough wear reliability due to too much wear if $\Delta BH[0.01, 0.8]$ exceeds 3 nm. Therefore it is reasonable that $\Delta BH[0.0\ 1, 0.8]$ must be not smaller than 0.2 nm and not larger than 3 nm.

EMBODIMENT 3

Figure 6:
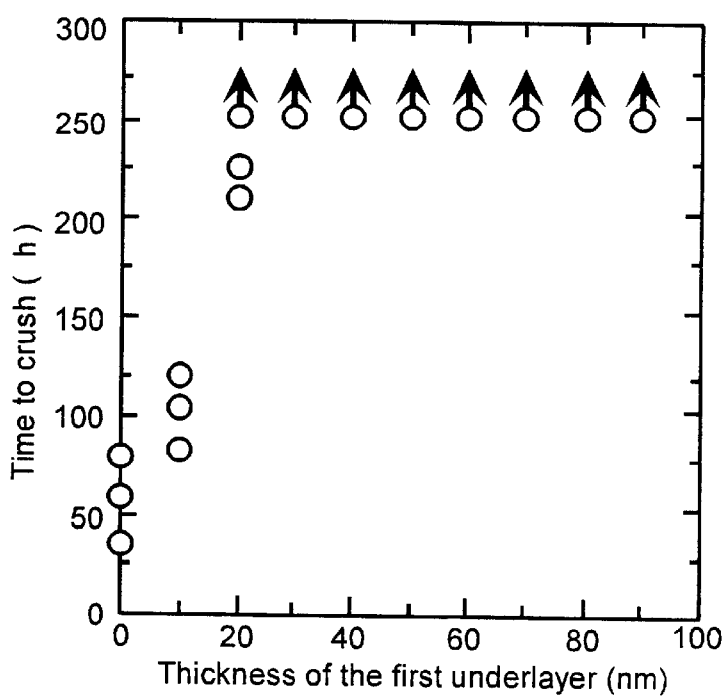
FIG. 6 is a figure to show the relation between the time until a crash occurred under frictional sliding wear test and the thickness of the first under layer.
Figure 7:
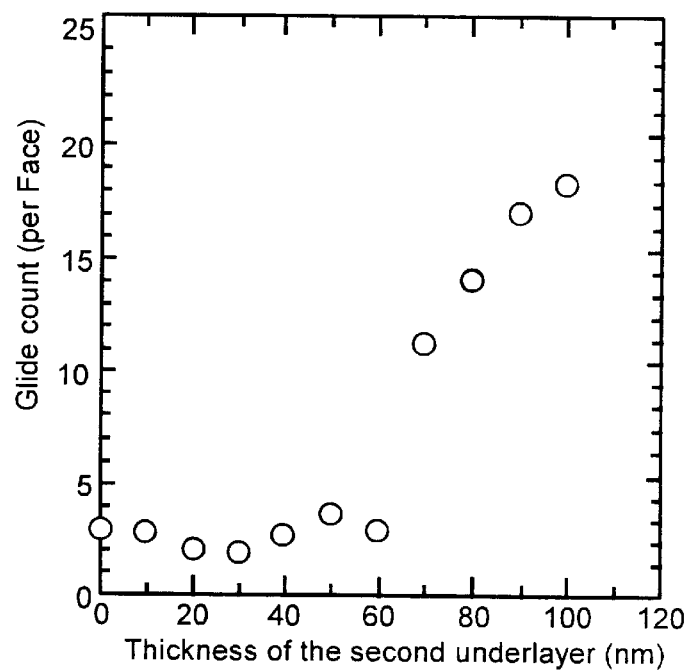
FIG. 7 is a figure to show the relation between glide count and the thickness of the second under layer.

As embodiment 3, two kinds of magnetic recording media were made. One was made under the same condition as the embodiment 1 described above except that the thickness of the first under layer is from 0 to 90 nm, and the other was made under the same condition as above except that the thickness of the second under layer is from 0 to 100 nm. FIG. 6 shows the relation between the time until a head crash occurred, while a head with the setting of 4 nm glide height was continuously contacting with media, and the thickness of the first under layer. FIG. 7 shows the relation between glide count when the glide height of the head was 7 nm and the thickness of the second under layer.

It was not found head crash after 250 hours in the case that the thickness of the first under layer was 20 nm or more. On the other hand, the time until head crash occurred was short if the thickness was less than 20 nm, which was approximately as a half as the case of 20 nm or less, so that the wear strength is not enough under the interface that the possibility of dynamically contacting of head with media is high. In general as to a sputtering machine used for forming each layers, not limited to the film forming machine made by Intevac used by the embodiments, the film thickness and the life of a target are in inverse proportion to each other, so that a thicker layer consumes more target and the production cost becomes high. It requires additional film forming chambers in order to shorten the production processing time and to reduce the target replacement frequency, which requires additional cost. Therefore, it is reasonable for the thickness of the first under layer to be not more than 80 nm.

As shown in FIG. 7, glide count is increased rapidly where the thickness of the second under layer exceeds 60 nm, while the glide count is no more than 4 where the thickness is equal to or less than 60 nm. This is unique problem of crystalloid as described above. It becomes easy to grow abnormally perpendicular to media surface when the thickness becomes thick. It can be considered that it contacts with the head gliding at 7 nm height where the thickness exceeds 60 nm. On the other hand, the coercive force of the second under layer of 2 nm thickness is 120 kA/m, which is absolutely not enough the coercive force of more than 240 kA/m necessary to the high recording density of 11 gigabits per square inch or more. The thickness of the second under layer must be 3 nm or more, more preferably 8 nm or more.

EMBODIMENT 4

Figure 8:
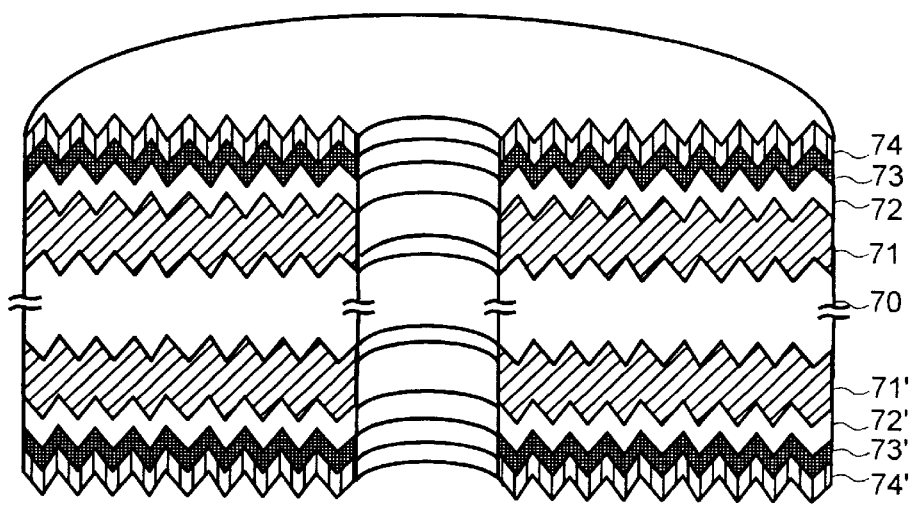
FIG. 8 is a drawing to illustrate a cross section of another embodiment of magnetic recording media of the present invention

FIG. 8 is a drawing of a cross section structure of an embodiment of magnetic recording media of the present invention. A disk substrate of 0.635 mm thick and 2.5 inch type of Almino-silicate glass with the surface chemically tempered was used as a substrate 70. It was formed with multi-layer films as follows on the surface by using a static magnetron sputtering system (MDP250B) made by Intevac after cleaned up. First, it was heated up to about 230 deg. C on the substrate using a lamp heater, and under layers 71 and 71' of 0 to 100 nm thickness composed of alloy with 80 at. % of Cr and 20 at. % of Ti were formed on both sides of the substrate 70. Magnetic layers 72 and 72' of 20 nm thickness composed of alloy with 66 at. % of Co, 22 at. % of Cr and 12 at. % of Pt were formed, and protective layers 73 and 73' of 8 nm thickness were formed on them, in this sequence. Then it was taken out of the sputtering system, and lubricant of perfluoro polyether as the main component is coated forming lubricant layers 74 and 74' of 2 nm thickness on the protective layers to finish magnetic recording media. Then, the surface shape of the media was measured using AFM under the same condition as embodiment 1. As the result, ΔBH[0.01, 50] was from 3.20 nm to 5.61 nm at 8 measuring points of both surfaces as total within the area of from 14 to 31 mm in radius.

Figure 9:
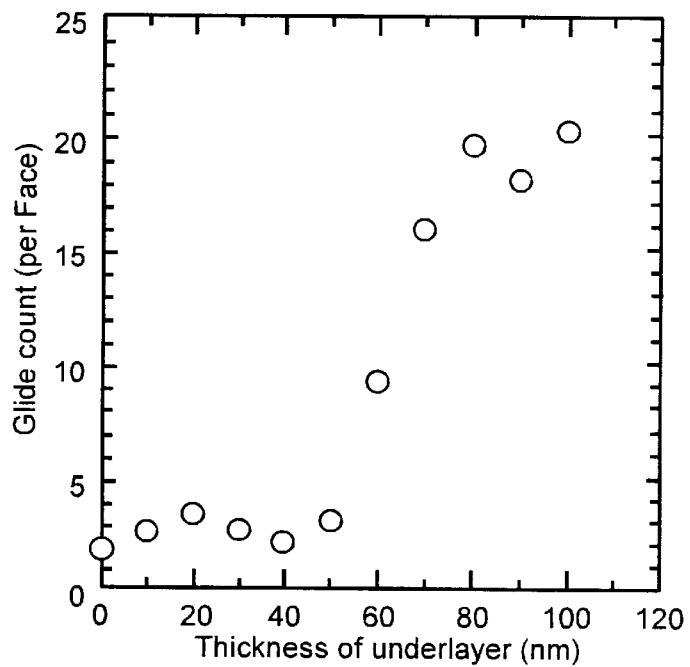
FIG. 9 is a figure to show the relation between of glide count in case of no amorphous under layer and the thickness of crystalline under layer.

FIG. 9 shows the relation between of the glide count in case of 7 nm glide height and the thickness of under layer. Glide count increases significantly in case of the thickness of the under layer to be more than 50 nm, while it is not more than 4 in case of the thickness to be 50 nm or less. This is unique problem of crystalloid as described above. It becomes easy to grow abnormally perpendicular to media surface when the thickness becomes thick. It can be considered that it contacts with the head gliding at 7 nm height where the thickness exceeds 60 nm. Thus, It is possible to obtain low glide height and enough wear strength necessary to high recording density of 11 gigabits per square inch or more as far as the thickness of crystalline under layer is not more than 50 nm even if substantial amorphous under layer is not formed between the substrate and crystalline under layer.

EMBODIMENT 5

According to Bearing ratio in FIG. 2, the difference between Bearing height BH[1%] where Bearing ratio is 1% and Bearing height BH[50%] where Bearing ratio is 50% is defined as y. And the difference between Bearing height BH[15%] where Bearing ratio is 15% and Bearing height BH[50%] where Bearing ratio is 50% is defined as x.

Figure 10:
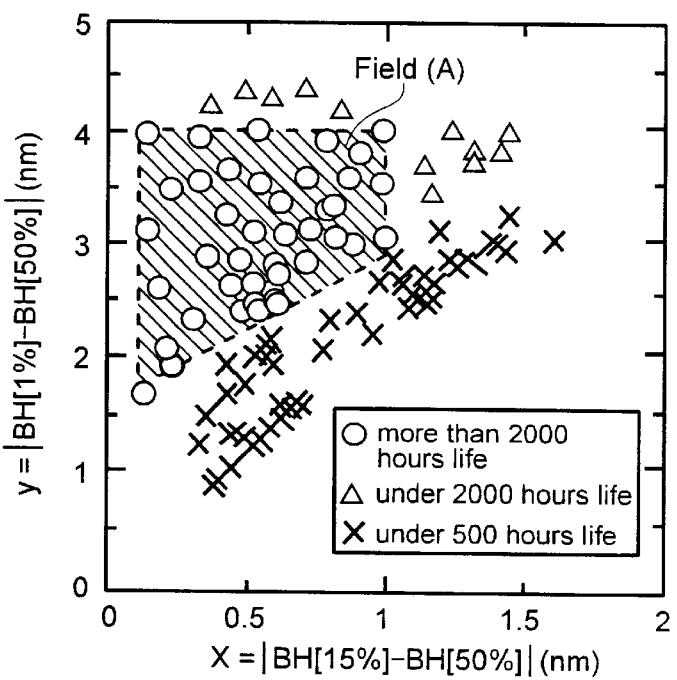
FIG. 10 is a mapping figure to show the relation between the time until a crash occurred under frictional sliding wear test and surface shape.

As embodiment 5, the surface shape of the media within the range that y is from 0.81 nm to 4.35 nm and x is from 0.11 nm to 1.66 nm was made by varying the surface shape of the substrate. Except than the surface shape above described, all the condition was same as embodiment 4. FIG. 10 shows the result of head crash test of continuous contact with media by setting of 4 nm glide height, by mapping with horizontal axis x and vertical axis y, where the symbol O means the media without. occurrence of crash until 2000 hours or more, the symbol means the media with crash occurred on or after 500 hours and before 2000 hours and the symbol X means the media with crash occurred before 500 hours. According to FIG. 10, a head crash occurred before 500 hours when y is below of a straight line connecting point (0.1, 1.6) and point (1, 3) expressed by coordinates (x, y). The line connecting point (0.1, 1.6) and point (1, 3) shows the relation between the height x at the center range of roughness (i.e., Bearing ratio is 15%) and the height y at the middle range of it (i.e., Bearing ratio is 1%), which shows that there exists necessary value y (limit height) from wearing characteristics against arbitrary x. This limit height itself is the necessary factor to surface design in order to ensure low glide height and high reliability. Therefore, it is considered that head can not be kept stable for long time, but is led to a head crash. In addition to it, a head crash will occur before 2000 hours in the field where x exceeds 1 nm or y exceeds 4 nm. Once media surface becomes to wear gradually, the center range of roughness can be the contacting zone under the frictional environment of head and media. In such case, larger x makes larger contacting area at higher level to increase friction force. It is considered as the reason why crash occurred before 2000 hours, that friction force was increased during the long time continuous contact test in the field where y was on or above the line connecting point (0.1, 1.6) and point (1, 3) and x was larger than 1 nm.

According to the mentioned above, it is possible to get enough friction resistant strength more than 2000 hours where a point expressed by coordinates (x, y) in FIG. 10 is within the field (A), which is surrounded by lines connecting points (0.1, 1.6) and (1, 3), connecting points (1, 3) and (1, 4), connecting points (1, 4) and (0.1, 4), and connecting points (0.1, 4) and (0.1, 1.6), so that we can obtain necessary low glide height and wear resistant strength for high recording density of 20 gigabits per square inch or more. Besides, enough characteristics was obtained even without amorphous under layer. Mathematical average of roughness (Ra) in the field (A) measured by AFM under the same condition as embodiment 1 was from 0.21 to 0.69 nm.

EMBODIMENT 6

Based on FIG. 10, magnetic recording media for embodiment 6, which surface roughness was within field (A), y was from 2.91 nm to 3.13 nm, and x was from 0.42 nm to 0.50 nm, was made under the same condition as embodiment 1 which had amorphous under layer except surface shape. Mathematical average of roughness (Ra) in embodiment 6 was from 0.39 nm to 0.48 nm.

As the result of continuous contact test of head and media by setting at 4 nm glide height, it was confirmed that it worked for 3000 hours or more without head crash. Low glide height and wear resistant strength necessary to high recording density of 40 gigabits per square inch or more were achieved.

EMBODIMENT 7

Figure 11:
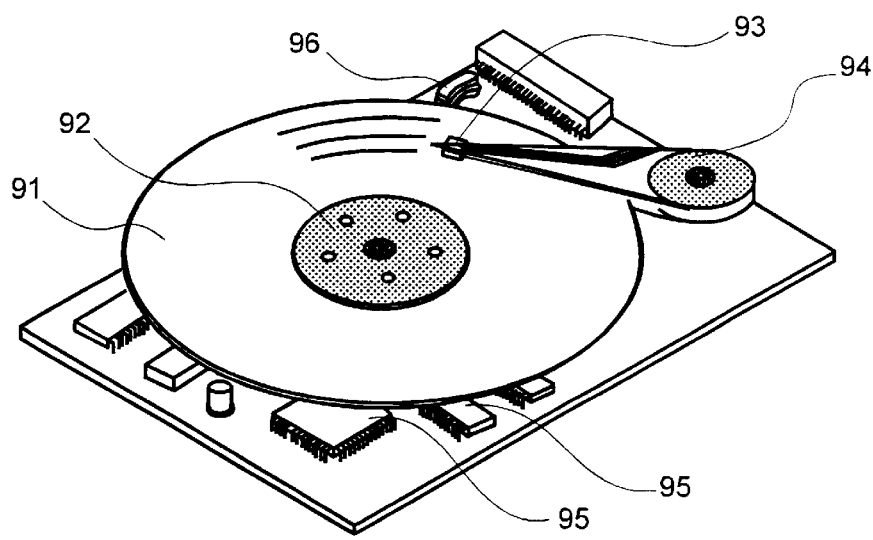
FIG. 11 is a drawing to illustrate a magnetic disk apparatus of the present invention.

A magnetic recording apparatus comprised magnetic recording media 91 mentioned by embodiments 1 to 6, a drive part 92 to drive said magnetic recording media, magnetic head 93 comprising recording part and reproducing part, means 94 to move said magnetic head relatively against said magnetic recording media, recording/reproducing processing means 95 comprising means to input signal to said magnetic head and to output signal from said magnetic head, and mechanical part 96 to retract said magnetic head at unload operation, as shown in FIG. 11.

Figure 12:
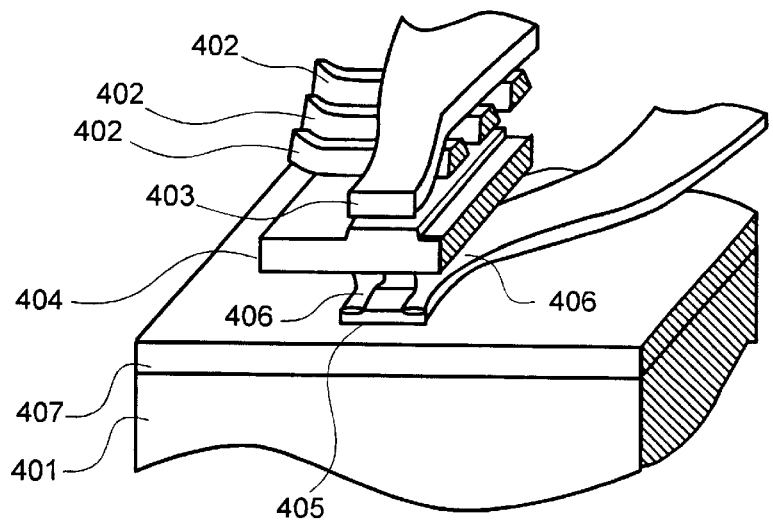
FIG. 12 is a drawing to illustrate an example of cross sectional structure of a magneto-resistive sensor of a magnetic head of a magnetic disk apparatus of the present invention.

Reproducing part of said magnetic head comprises a magneto-resistive type magnetic head. FIG. 12 was an oblique perspective figure to illustrate the structure of a magnetic head. This head was a composite head which comprises of a inductive head for recording and a magneto-resistive head for reproducing formed on a base body 401. Said recording head comprised an upper recording magnetic pole piece 403 and a piece 404 used for both lower recording magnetic pole piece and upper shield layer, between which a coil 402 was put, and the gap length between two recording poles was 0.27 $\mu$m. Copper in 3 $\mu$m thick was used for the coil. Said reproducing head comprised a magneto-resistive sensor 405 and electrode pattern 406 on both sides of the sensor, and the magneto-resistive sensor was put between the piece 404 used for both lower recording magnetic pole piece and upper shield layer and the lower shield layer 407. The distance between two shields was 0.15 $\mu$m. The gap layer between recording magnetic poles and the gap layer between a shield layer and a magneto-resistive sensor are not shown in this figure.

Figure 13:
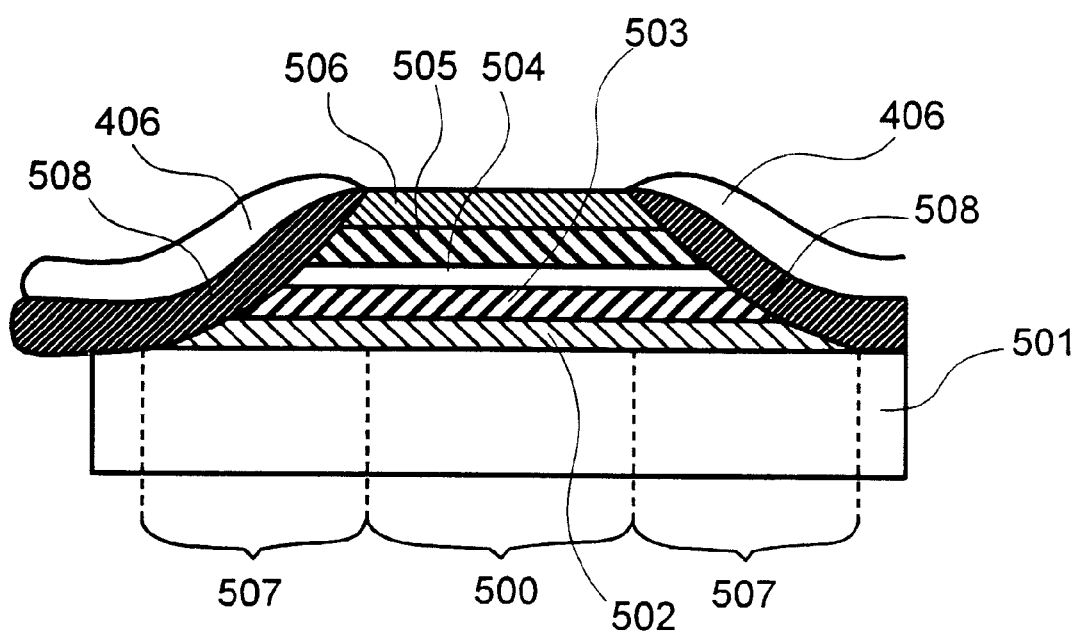
FIG. 13 is a drawing to illustrate another example of cross sectional structure of a magnetic head and a magneto-resistive sensor of a magnetic disk apparatus of the present invention.

FIG. 13 shows cross sectional structure of magneto-resistive sensor. Signal detection part 500 of magnetic sensor comprised plural electro-conductive magnetic layers, which created large change of resistance caused by relatively changing of mutual magnetizing direction along to external magnetic field, and a magneto-resistive sensor (Spin Valve type of reproducing element) which contains an electro-conductive nonmagnetic layer located between the plural electro-conductive magnetic layers. The structure of this magnetic sensor is composed of Ta buffer layer 502, the first magnetic layer 503, middle layer 504 of copper, the second magnetic layer 505 and anti-ferromagnetic layer 506 of Fe-50 at. % Mn alloy, formed on a gap layer 501 in this order. Ni-20 at. % Fe alloy was used for said first magnetic layer, and cobalt for said second magnetic layer. The magnetizing direction of the second magnetic layer is fixed due to exchange magnetic field of anti-ferromagnetic layer. On the other hand, the magnetizing direction of the first magnetic layer, located adjacent to the second magnetic layer through a non-magnetic layer, is changed by the leakage flux from magnetic recording media, so that change of resistance is caused.

There is taper part 507 formed as taper shape on both sides of a signal detection part. This taper comprises permanent magnet layer 508 to unify the first layer as a single magnetic domain and a pair of electrodes 406 to take out signal formed on the permanent magnet layer. Co—Cr—Pt alloy was used as the permanent magnet layer since it is required that it has large coercive force and the magnetizing direction does not change easily.

A magnetic recording apparatus shown in FIG. 11 was comprised by the combination of the recording media of the present invention described in embodiments 1 through 5 and above magnetic head shown in FIG. 12. The magnetic recording apparatus with any of the media above achieved the recording density of 11 gigabits per square inch or more.

As for the magnetic head of the present embodiment, the minimum glide height was 10 nm, and a magneto-resistive head was formed on the magnetic head slider whose area of gliding rails was no more than 1.4 square millimeter and mass was 2 mg or less. Shock resistant reliability is improved if the area of gliding rails of slider is kept 1.4 square millimeter or less and the mass is 2 mg or less. According to this above, both high recording density and high shock resistant strength were achieved, and 300,000 hours or more of MTBF (Mean Time Between Failures) was achieved with 11 gigabits per square inch or more of recording density.

EMBODIMENT 8

FIG. 1 illustrates a cross section of an embodiment of magnetic recording media of the present invention. A disk substrate of 0.635 thick and 2.5 inches type of Almino-silicate glass with the surface chemically tempered was used as a substrate 10. Multi-layer films as follows were formed on the surface by using a static magnetron sputtering system (MDP250B) made by Intevac after cleaned up the substrate. First, the first under layers 11 and 11' of 40 nm thickness composed of alloy with 83 at. % of Ni and 17 at. % of P were formed on both sides of the surface of a substrate 10. Thereafter, it was heated up to about 230 deg. C on the substrate using a lamp heater, then the second under layers 12 and 12' of 30 nm thickness composed of alloy with 80 at. % of Cr and 20 at. % of Ti were formed, magnetic layers 13 and 13' of 20 nm thickness composed of alloy with 66 at. % of Co, 22 at. % of Cr and 12 at. % of Pt were formed, and protected layers 14 and 14' of 8 nm thickness were formed on them, in this sequence. Then it was taken out of the spattering system, and lubricant of perfluoro polyether as the main component is coated on the protective layers to form lubricant layers 15 and 15' of 2 nm thickness. At the forming all of the first under layers 11 and 11', the second under layers 12 and 12', and magnetic layers 13 and 13' Ar was used as discharging gas which pressure was 7 mTorr (0.933 Pa). And Ar gas containing nitrogen was used for discharging gas at forming a protective layer of carbon 14 and 14', which pressure was 10 mTorr (1.33 Pa).

As an evaluation purpose of the finished platter, the magnetic recording media produced by the above method was cut, the stacked layer films portion was thinned by ion-thinning method on both sides in the perpendicular axis of the films like conical shape, and then the micro-structure of the first under layer was observed by a transmission electron microscope with 200 kV acceleration voltage. As the result, there was no crystalline particle greater than 5 nm in diameter found. And also, halo was observed by taking a photo of selected area electron diffraction image, by which it was confirmed the piece to be substantial amorphous.

As the result of measurement of 8 points as total within the area from 14 mm to 31 mm in radius of the surface of the substrate used by the present embodiment, ΔBH[0.01, 50] at each measuring points was between 4.22 nm and 5.29 nm.

According to the above, even with first under layer of Ni—P alloy, it was substantially amorphous and magnetic recording media whose ΔBH[0.01, 50] was from not less than 3 nm to not more than 6 nm could be made.

When the ratio SLF/Nd, where SLF was an output amplitude (0-p) of read-back isolated waveform and Nd was integrated media noise in case of recording a signal at 400 kFCI recording density, was evaluated using this media, the result was so high as 26.4dB. The head used here comprised a reproducing element of spin valve type with the shield gap length Gs of 0.18 micron, as shown by the embodiment 4, and an inductive recording element with the gap length of 0.25 micron, and the glide height was 15 nm.

The magnetic recording media according to the present invention is possible to reduce contacting damage of magnetic head and magnetic recording media, which may occur under very low glide height environmental condition during a magnetic disk apparatus is operating, and to achieve high wear reliability as well as low noise characteristics which is important to get high recording density.

What is claimed is:

1. A magnetic recording media formed of magnetic alloy layer on a substrate through an under-layer, a protective layer and a lubricant layer, stacked in this order, wherein when the difference between a height BH[0.01%] where a Bearing ratio is 0.01% and a height BH[50%] where a Bearing ratio is 50% is defined as y (=|BH[0.01%]-BH[50%]|); and the difference between a height BH[15%] where a Bearing ratio is 15% and a height BH[50%] where a Bearing ratio is 50% is defined as x (=|BH[15%]-BH[50%]|), where a Bearing Curve is given by a surface roughness curve of said magnetic recording media, the point of coordinates (x, y) is within the field surrounded by the lines connecting points (0.1, 1.6) and (1, 3), connecting points (1, 3) and (1, 4), connecting points (1, 4) and (0.1, 4), and connecting points (0.1, 4) and (0.1, 1.6) on an x, y plane.

2. A magnetic recording media according to claim 1 formed of a magnetic alloy layer on a substrate through an under-layer, a protective layer and a lubricant layer, stacked in this order, wherein the mathematical average of roughness (Ra) given by a surface roughness curve of said magnetic recording media is not less than 0.2 nm and not more than 0.7 nm.

3. A magnetic recording media according to claim 1 formed of magnetic alloy layer of Co as the main component on a substrate through an under-layer, a protective layer and a lubricant layer, stacked in this order, wherein said under-layer comprises plural under-layers including the construction of a first under-layer of substantially amorphous material and a second under-layer of crystalline material stacked in this order.

4. A magnetic recording apparatus, which comprises:

a magnetic recording media, a drive part driving said magnetic recording media, magnetic heads comprising a recording part and a reproducing part, means to move said magnetic heads relatively against the magnetic recording media, a mechanical part to make said magnetic heads ramp, signal input means to said magnetic heads, and recording and reproducing signal processing means to reproduce the output signal from said magnetic heads, wherein the reproducing part of said magnetic heads comprises plural electro-conductive magnetic layers which make a resistance change due to a relative change of a mutual magnetizing direction caused by an external magnetic field and a magneto-resistive sensor containing an electro-conductive nonmagnetic layer placed between said electro-conductive magnetic layers, and said magnetic recording media is according to one of claims 1 through 3.

5. A magnetic recording media according to claim 2 formed of magnetic alloy layer of Co as the main component on a substrate through an under-layer, a protective layer and a lubricant layer, stacked in this order, wherein said under-layer comprises plural under-layers including the construction of a first under-layer of a substantially amorphous material and a second under-layer of crystalline material stacked in this order.

* * * * *

UNITED STATES PATENT AND TRADEMARK OFFICE
CERTIFICATE OF CORRECTION

PATENT NO. : 6,509,111 B1
DATED : January 21, 2003
INVENTOR(S) : Mitsuhiro Shoda et al.

It is certified that error appears in the above-identified patent and that said Letters Patent is hereby corrected as shown below:

Column 12,
Line 26, change "symbol means" to -- symbol $\Delta$ means --.

Signed and Sealed this

Twenty-sixth Day of August, 2003

JAMES E. ROGAN
*Director of the United States Patent and Trademark Office*